US007231597B1

(12) United States Patent
Braun et al.

(10) Patent No.: US 7,231,597 B1
(45) Date of Patent: Jun. 12, 2007

(54) METHOD, APPARATUS, AND COMPUTER-READABLE MEDIUM FOR CREATING ASIDES WITHIN AN ELECTRONIC DOCUMENT

(75) Inventors: Owen C. Braun, Seattle, WA (US); Christopher H. Pratley, Seattle, WA (US); Peter L. Engrav, Seattle, WA (US); Mark Yalovsky, Seattle, WA (US); Steven J. Sinofsky, Seattle, WA (US); Alex J. Simmons, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 801 days.

(21) Appl. No.: 10/266,009

(22) Filed: Oct. 7, 2002

(51) Int. Cl.
*G06F 17/00* (2006.01)
*G06F 3/048* (2006.01)

(52) U.S. Cl. .................... 715/512; 715/804; 715/780

(58) Field of Classification Search ............... 715/512, 715/805, 776, 804
See application file for complete search history.

(56) References Cited

U.S. PATENT DOCUMENTS

| | | | | |
|---|---|---|---|---|
| 5,596,700 | A * | 1/1997 | Darnell et al. | 715/512 |
| 5,613,019 | A | 3/1997 | Altman et al. | 382/311 |
| 6,230,170 | B1 * | 5/2001 | Zellweger et al. | 715/512 |
| 6,584,479 | B2 * | 6/2003 | Chang et al. | 715/512 |
| 6,762,777 | B2 * | 7/2004 | Carroll | 715/808 |
| 7,103,848 | B2 * | 9/2006 | Barsness et al. | 715/776 |
| 2002/0049787 | A1 * | 4/2002 | Keely et al. | 707/512 |
| 2002/0196284 | A1 * | 12/2002 | Berquist et al. | 345/769 |

OTHER PUBLICATIONS

Landay, J..A., "Using Note-Taking Appliances for Student to Student Collaboration," 29th Annual Frontiers in Education Conference, *Designing the Future of Science and Engineering Education*, Conference Proceedings, vol. II, IEEE Education Society, IEEE Computer Society, Nov. 10-13, 1999, p. Session 12C4/15-12C4/20.
Pilon, D.; Raymond, J.; Raymond, P., "Software Tools to Improve Note-Taking In the Classroom," IEEE Transactions on Education, vol. 40, No. 4, Nov. 1997, p. 292.

(Continued)

*Primary Examiner*—Raymond J. Bayerl
*Assistant Examiner*—Dennis G. Bonshock
(74) *Attorney, Agent, or Firm*—Merchant & Gould

(57) ABSTRACT

A method, apparatus, and computer readable medium for creating asides within an electronic document are provided. The keystroke combination is defined for creating an aside with an electronic document. If the keystroke combination is received, a location is identified within the electronic document for an aside object. Once the location for the aside has been determined, an outline object is created at the location. The outline object holds text or other contents for the aside. An insertion point is then placed within the object. The user may then enter keystrokes or other data into the second object. If the keystroke combination is again entered, the insertion point is returned to its location immediately prior to moving the insertion point to the aside object. The keystroke combination for creating an aside and the keystroke combination for returning from the aside may be identical. Asides may also be created in various portions of an electronic document, such as a title portion, in a similar manner.

12 Claims, 8 Drawing Sheets

OTHER PUBLICATIONS

Landay, J. A.; Davis, R.C., "Making Sharing Pervasive: Ubiquitous Computing For Shared Note Taking," *IBM Systems Journal*, vol. 38, No. 4, 1999, p. 531-550.

Schlimmer, J.C.; Hermens, L.A., "A Software Agent For Note Taking," School of Electrical Engineering and Computer Science, Washington State University, Pullman, WA, Software Agents. Papers From the 1994 AAAI Symposium, p. 118-121.

Chiu, P.; Kapuskar, A.; Reitmeier, S.; Wilcox, L., "NoteLook: Taking Notes in Meetings With Digital Video and Ink," FX Pal Alto, Laboratory, Pal Alto, California, Proceedings ACM Multimedia 99, Oct. 1999, p. 149-158.

Chiu, P.; Wilcox, L., "A Dynamic Grouping Technique for Ink and Audio Notes," 11th Annual Symposium On User Interface Software and Technology (UIST), Proceedings of the ACM Symposium, Nov. 1998, p. 195-202.

Gwizkda, J., "Categorization is Difficult: Use of An Electronic Notebook for Organizing Design Meeting Notes," Department of Mechanical and Industrial Engineering, University of Toronto, Canada, Proceedings of the Human Factors and Ergonomics Society, 42nd Annual Meeting, vol. 1, Oct. 1998, p. 516-520.

Wilcox, L.; Schlilit, B.; Bly, S.; Chiu, P., "Dynomite: A Dynamically Organized Ink and Audio Notebook," IEEE Seminar Living Life to the Full With Personal Technologies,The Institution of Electrical Engineers, Informatics Division,, Digest No. 1998/268, Jun. 1998, pp. 1/1-1/4.

\* cited by examiner

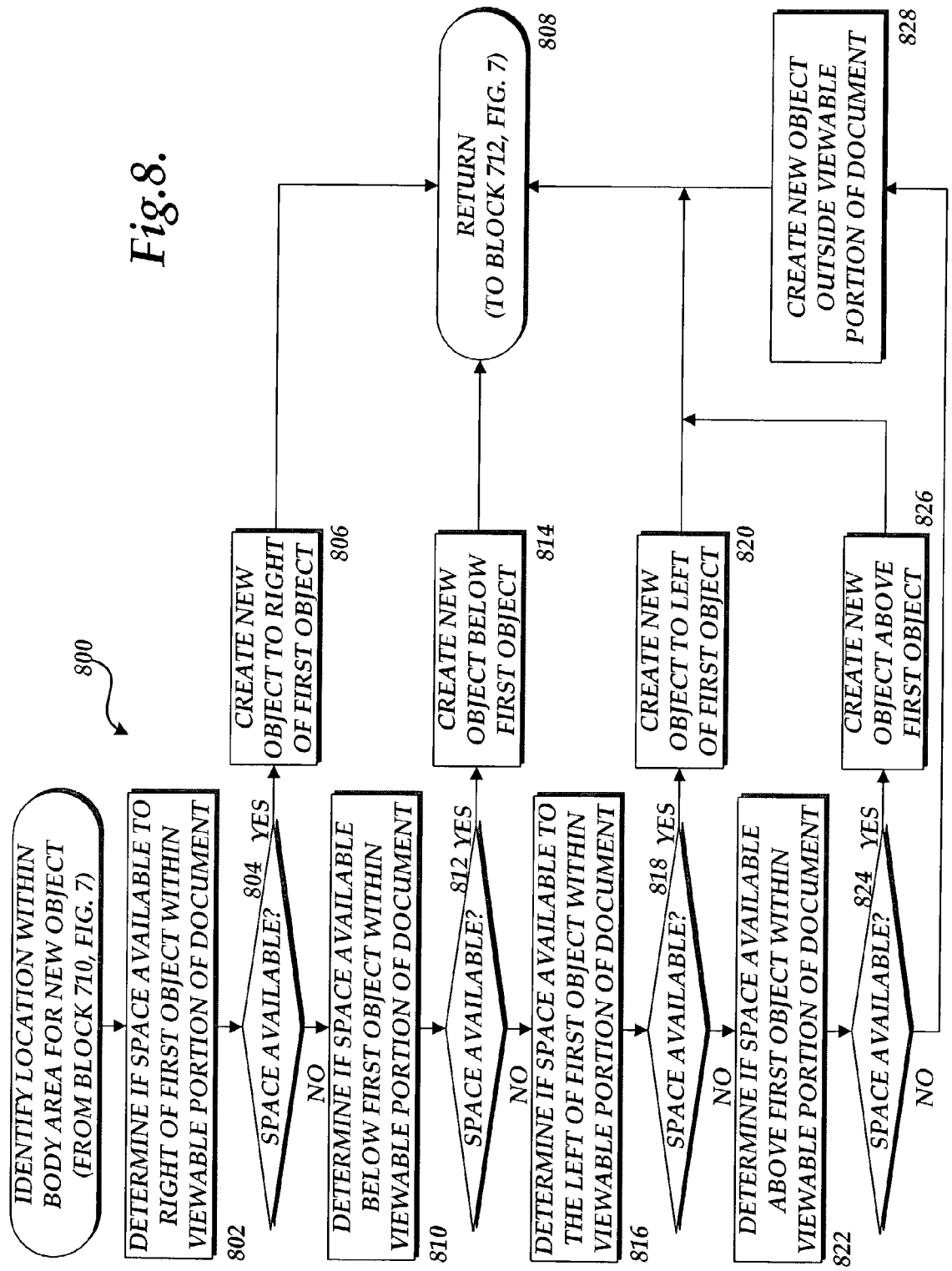

METHOD, APPARATUS, AND COMPUTER-READABLE MEDIUM FOR CREATING ASIDES WITHIN AN ELECTRONIC DOCUMENT

TECHNICAL FIELD

The invention generally relates to the field of electronic document processing and, more specifically, to the field of object creation within an electronic document.

BACKGROUND OF THE INVENTION

When taking handwritten notes on a particular topic, it is common to exit the main body of notes, write down something elsewhere on the page, and return to the main body of notes. This activity is commonly referred to as creating an "aside" to the main body of notes. Asides may be necessary to write down an idea completely unrelated to the main body of notes, or a reminder, such as a reminder to buy a birthday gift for a relative. Asides such as these are frequently created at a place where the content will stand out from the rest of the content on the page, such as in the page margins or at the top of a page. Alternatively, asides may be used to create the beginning of a new subset of notes somewhere else on the page that will be used at a later time. The note taker can then easily jump back to the original position within the main body of notes and return to where they left off.

Creating asides using a pen and paper is a trivial task. A note taker simply finds some empty space on the page, creates the aside, and then returns the pen to their previous position. However, creating asides in an electronic document is not so easy, especially for touch typists that do not like to remove their hands from the computer keyboard. Currently, to create an aside within an electronic document, such as a word processing document, the user must take their hands off of the keyboard, grasp a computer mouse or other pointing device, locate space within the electronic document for the aside, and then select the desired location. The user must then return their hands to the keyboard and type the contents of the aside.

When the user has finished typing the contents of the aside, the user must again grasp the mouse or other pointing device, take time to find the location where they were typing prior to creating the aside, and then select the location. The user may then return their hands to the keyboard to begin typing where they left off. This process involves many steps and can be extremely time consuming and frustrating for users, especially users that prefer a keyboard to a mouse. Therefore, there is a need for an improved method for creating asides within an electronic document that reduces the number of steps required to create an aside.

SUMMARY OF THE INVENTION

The present invention solves the above-described problems by providing an improved method, computer-controlled apparatus, and computer-readable medium for creating asides within an electronic document. According to the present invention, a user can create an aside within an electronic document and return to their original position without removing their hands from a keyboard.

Generally described the present invention provides methods for creating an aside within an electronic document, such as an electronic document containing typewritten notes, a word processing document, a spreadsheet, or other type of electronic document. According to one method, an insertion point may be placed by a user within the electronic document to identify a location where typed input should be placed. An outline object may then be created at the location of the insertion point. Keystrokes typed by the user are then added to the outline object and displayed. In this manner, a user can generate typewritten notes in an outline format.

According to one method, a particular keystroke combination may be defined for creating an aside within the electronic document. If the keystroke combination is received, a location is identified within the electronic document for the aside. The location for the aside is different that the location of the outline object that the user was typing in when the keystroke combination was generated. Once the location for the aside has been determined, a second outline object is created at the location for the aside. The second outline object holds the text and other contents of the aside. The insertion point is then placed within the second object. The user may then enter data into the second object in an outline format.

According to one method, a keystroke combination may also be defined for returning to the previous position of the insertion point in the first object from the current position of the insertion point in the aside object. If the keystroke combination is received, the insertion point may be returned to its location within the first object immediately prior to the creation of the second outline object. Moreover, the keystroke combination for creating an aside and the keystroke combination for returning from the aside may be identical. In this manner, only one keystroke combination is required to both create and return from an aside. Alternatively, a dedicated key may be provided on a keyboard for creating and returning from asides. A user may also create asides in various portions of the electronic document, such as an area of the document containing a title, in a similar manner.

The present invention also provides a computer-readable medium and computer-controlled apparatus for creating asides within an electronic document. Additional details regarding various aspects of the present invention will become apparent from the detailed description of the invention that follows.

BRIEF DESCRIPTION OF THE DRAWINGS

FIG. 8 is a flow diagram illustrating a routine for identifying a location within an electronic document for the placement of an aside object according to one embodiment of the invention.

DETAILED DESCRIPTION

As described briefly above, embodiments of the present invention provide methods, apparatus, and computer-readable media for creating asides in electronic documents. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
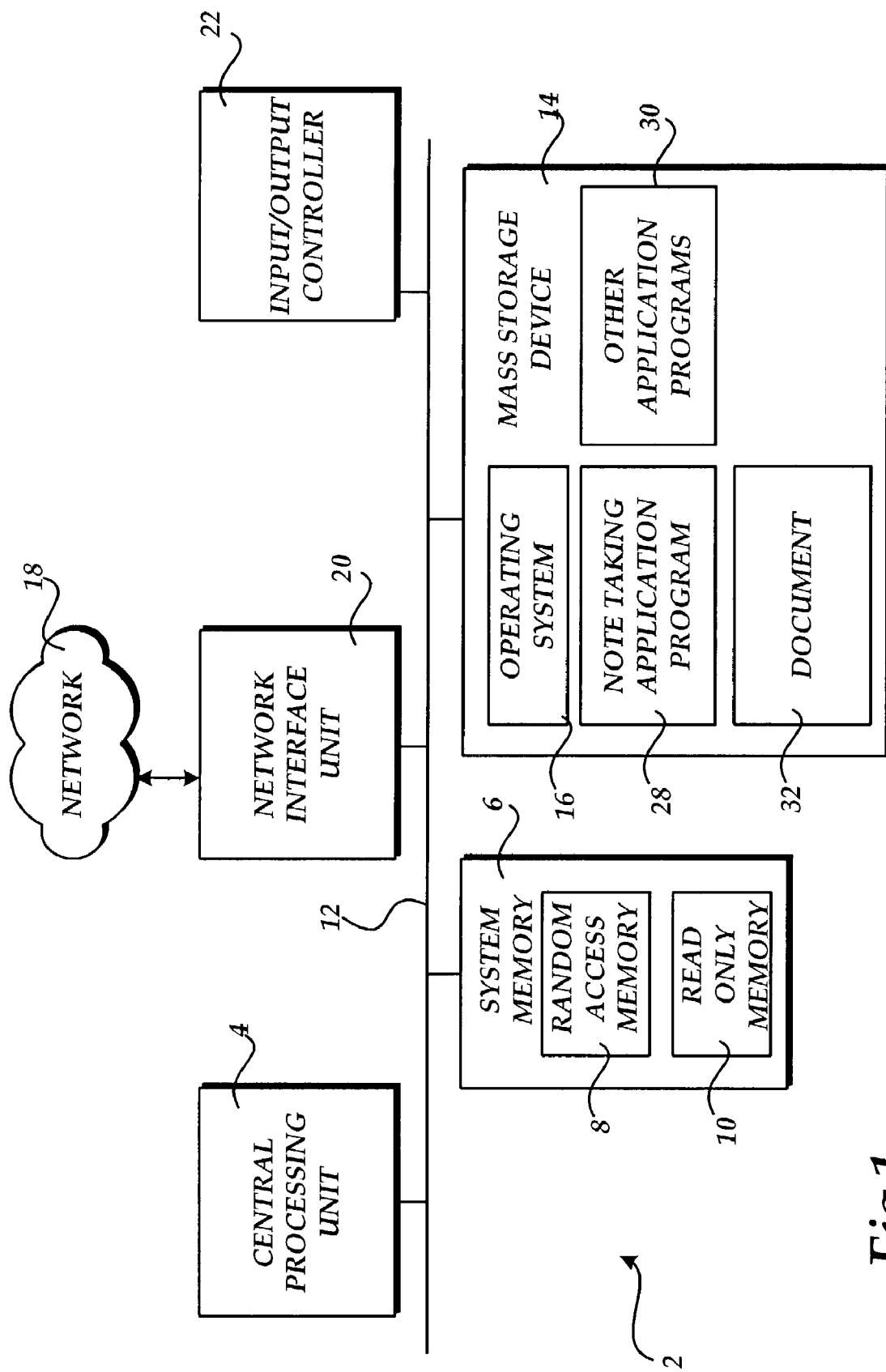
FIG. 1 is a block diagram showing an illustrative computer architecture for a computer utilized by the various embodiments of the invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 28, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a network 18, such as the Internet. The personal computer 2 may connect to the network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store a note taking application program 28 for creating and editing an electronic document 32 containing typewritten notes or notes written with an electronic stylus. Although the embodiments of the invention described herein are described in the context of a note taking application program 28, the embodiments of the invention may also be used similarly with a word processing application program, a spreadsheet application program, or other application programs for creating and editing other types of electronic documents. Additional details regarding the operation of the note taking application program 28 will be described in greater detail below.

Figure 2:
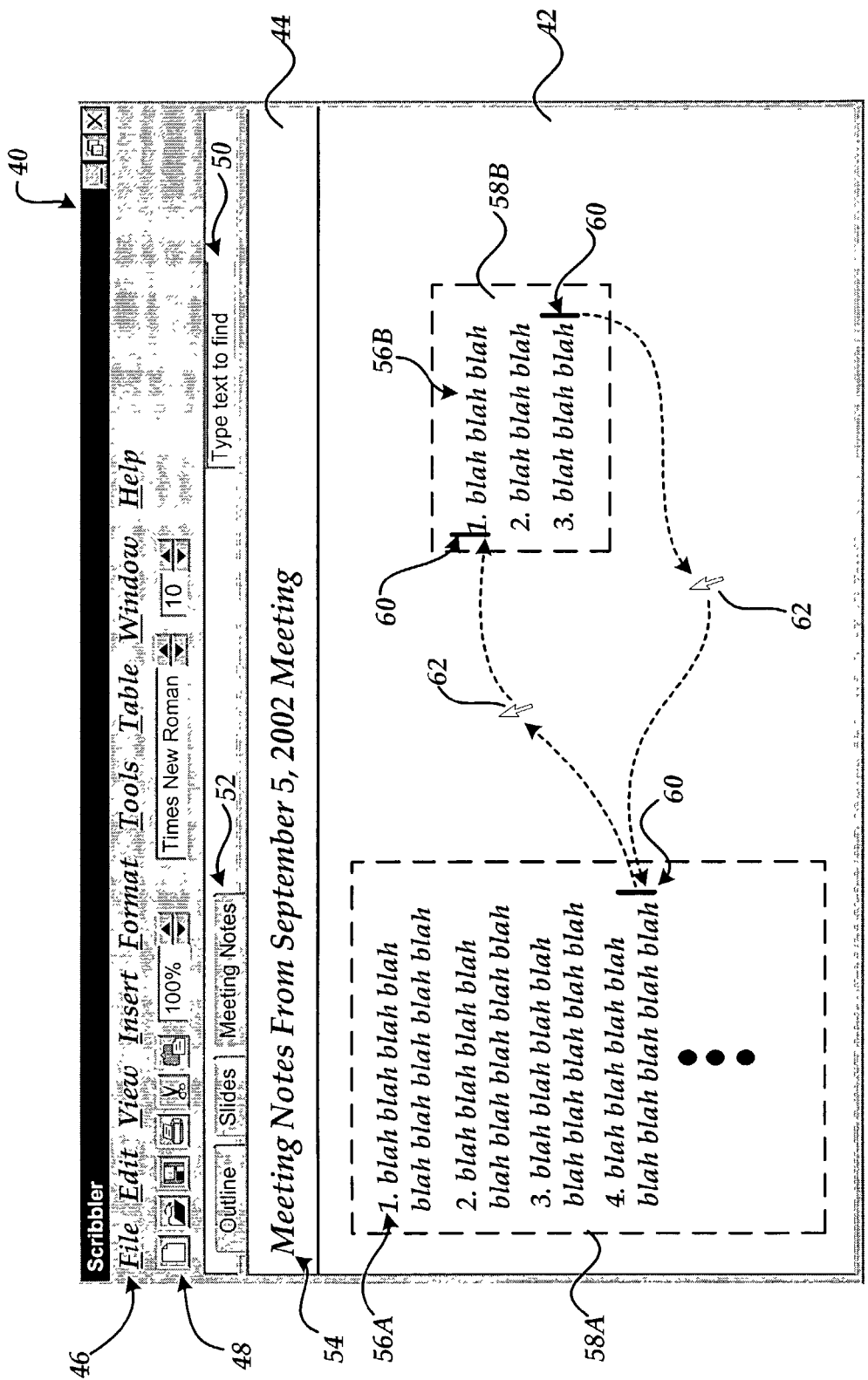
FIGS. 2–6 are screen diagrams showing illustrative screen displays provided by various embodiments of the invention.

Referring now to FIG. 2, additional aspects regarding the operation of the note taking application program 28 will be described. As mentioned briefly above, the note taking application program 28 provides a two-dimensional freeform surface for recording typewritten or pen written notes. To provide this functionality, the note taking application program 28 generates an application window 40. The application window 40 includes a number of conventional tools for creating and editing typewritten or pen written notes. In particular, a menu 46 is provided allowing a user easy access to various tools through keystroke commands or through mouse selection. Additionally, a toolbar 48 is provided that allows a user to select the various tools through an iconic interface. Zoom levels, fonts, and font sizes may also be similarly selected using visual elements. A search box 50 is also provided that allows easy searching of the contents of electronic documents open in the application window 40.

According to the various embodiments of the invention, the electronic document 32 utilized by the note taking application program 28 includes a body area 42 and a title area 44. The body area 42 is a freeform two-dimensional surface in which textural or pen written notes may be generated and recorded by a user anywhere on the page. It should be appreciated that the size of the body area 42 is not limited to the viewable portion shown in the application window 40 and that the size of the body area 42 may be extended indefinitely in any direction. In order to view the entire area of the electronic document 32, the viewable area within the application window 40 may be scrolled. The contents of the title area 44 are continuously displayed regardless of the scroll position of the body area 42.

In order to navigate between multiple open documents 32, the application window 40 also includes one or more page tabs 52. As shown in FIG. 2, the document 32 having a page tab 52 entitled "Meeting Notes" is selected, thereby displaying the electronic document 32 having a title 54 of "Meeting Notes from Sep. 5, 2002 Meeting." Through the use of the page tabs 52, a user may easily select other documents 32 open in the application window 40.

In order to generate notes within the body area 42, a user may place an insertion point 60 at the position at which they would like to generate notes. The user may then type the text 56A at the position of the insertion point 60. As the user types, the insertion point 60 is moved to reflect the typed characters in a conventional manner. According to one embodiment of the invention, the text 56A is maintained within an outline object 58A. An outline object is an object that contains text, handwritten ink, or pictures. One or more outline objects may exist on a page. All text and ink handwriting must reside in an outline object. Content in a single outline object have either parent/child or sibling/cousin relationships to each other. An outline object may be selected, thus causing the selection of all of the content within the outline object. Any operation performed on an outline object is performed on the entire contents of the outline object. In this manner, the text 56A typed by the user may be maintained in an organized fashion. Pen written notes may also be generated and organized in a similar fashion. Because the body area 42 is two-dimensional and freeform, a user can click and type anywhere on the page and create a new outline object or add to an existing outline object.

The note taking application program 28 allows a second outline object 58B to be created within the body area 42. In particular, in order to create a second outline object 58B, a mouse cursor 62 may be moved by a user to another location within the body area 42. If the user makes a selection with the mouse, the insertion point 60 is moved to the selected location. An outline object 58B is then created at the new location and the user is free to type into the new outline object 58B. As discussed above, the insertion point 60 moves as the user types or draws characters in a conventional manner. If the user wishes to return the insertion point to the previous location within the outline object 58A, the user must utilize the mouse to move the mouse cursor 62 to the location within the outline object 58A where the insertion point 60 was previously placed. As described above, the process of generating a second outline object 58B in a separate portion of the body area 42, typing in the second outline object 58B, and relocating the mouse cursor 62 to its previous location utilizing a mouse in this manner may be inconvenient for users that prefer to utilize a keyboard. Therefore, the note taking application program 28 supports an improved method for generating additional outline objects, also called aside objects, within the body area 42 of the electronic document 32. Various details regarding this method will be described in further detail below with respect to FIGS. 3–8.

Figure 3:
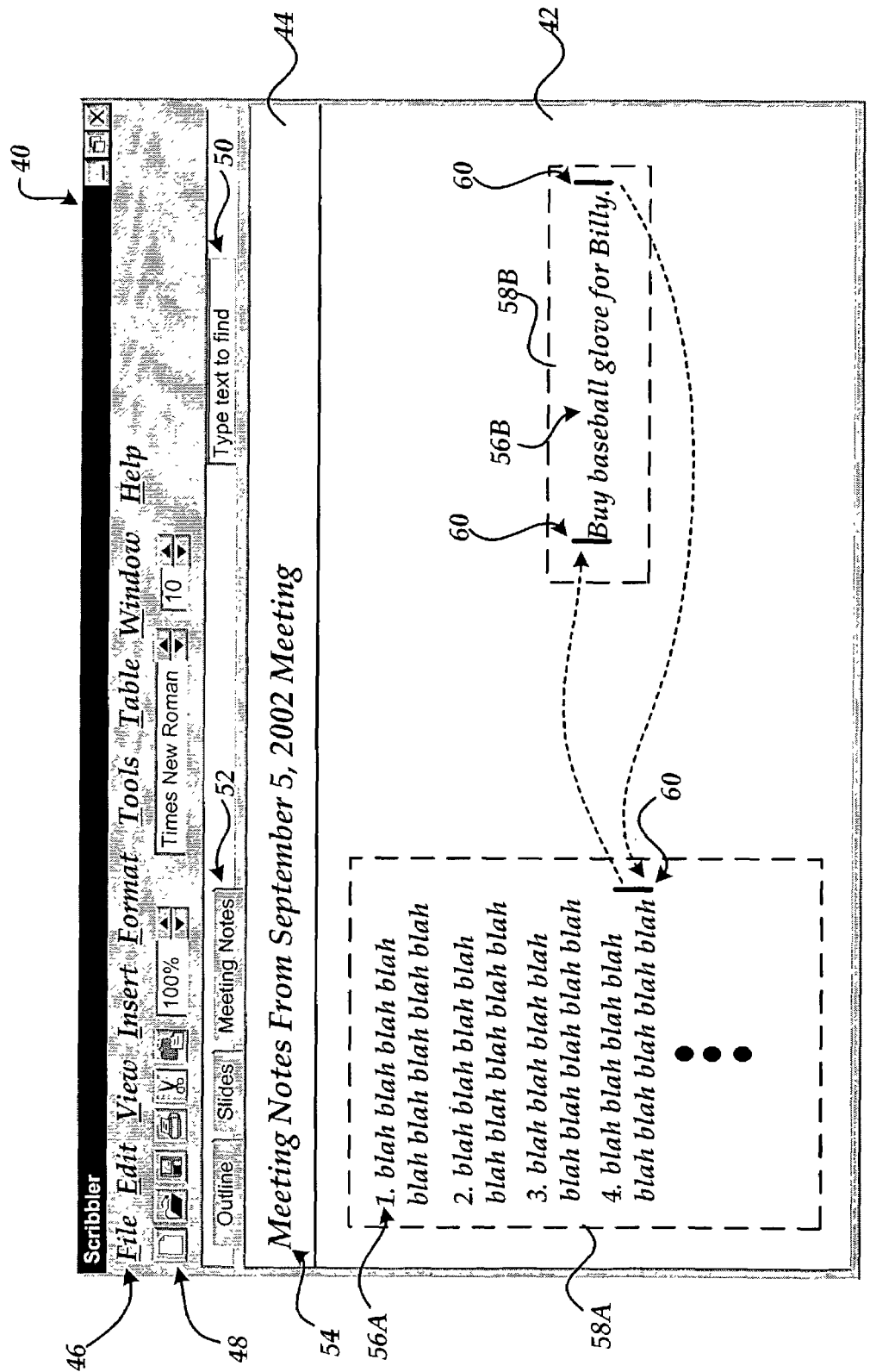

Turning now to FIG. 3, additional details regarding a method provided by embodiments of the invention for creating an aside within an electronic document will be described. As shown in FIG. 3, an insertion point may be placed within an outline object 58A for typing or writing information into the object. According to the various embodiments of the invention, a keystroke combination or other input combination may be defined for generating an aside. In particular, according to one embodiment of the invention, a keystroke combination, such as control-A, is defined for creating an aside. If a user is typing into an outline object 58A and selects the keystroke combination, requesting that an aside be generated, the note taking application program 28 is operative to identify a location within the electronic document 32 for the aside that is different than the location of the outline object 58A. Once a location has been identified, an outline object is created at the second location and the insertion point is moved to a location within the outline object. The user may then type or otherwise enter data into the outline object. It should be appreciated that the location and creation of the aside object and the movement of the insertion point is performed directly in response to the user selection of a single keystroke according to one embodiment of the invention. Moreover, it should also be appreciated that other types of input devices and methods may be utilized to create and return from an aside. For instance, a voice command or handwriting gesture may be defined for performing this action.

According to one embodiment of the invention, a keystroke combination is also defined that returns the insertion point 60 to its previous location within the outline object 58A prior to creation of the aside. According to one embodiment, the keystroke combination for creating an aside is identical to the keystroke combination for returning the insertion point 60 to the outline object 58A. Additional details regarding the process of locating an appropriate location within the electronic document 32 for the new outline object 58B will be described in greater detail below with respect to FIG. 8.

Figure 4:
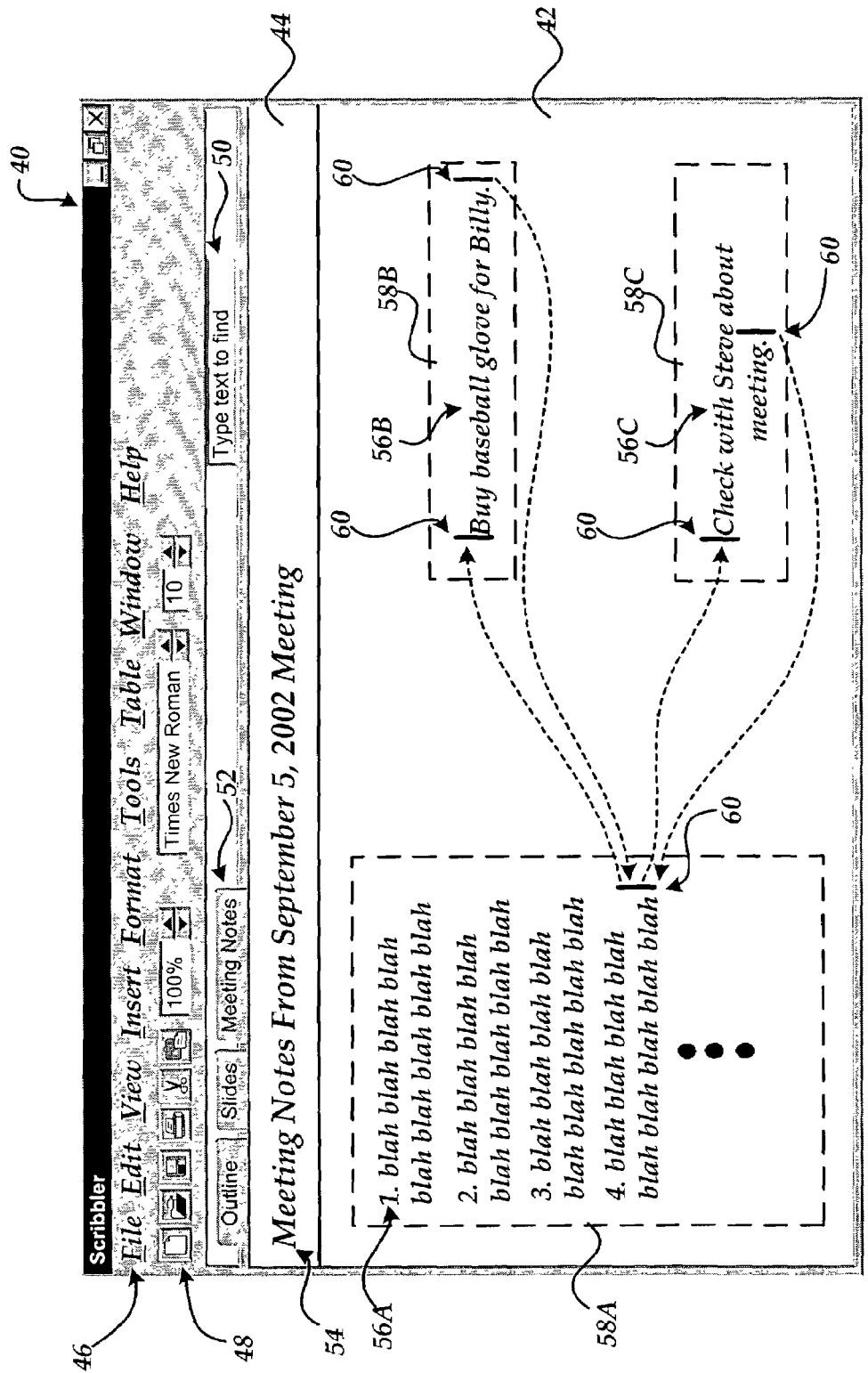

Referring now to FIG. 4, additional aspects regarding features of the note taking application program 28 for creating asides within an electronic document 32 will be described. As shown in FIG. 4, multiple asides may be created within a single electronic document 32. In particular, as described above, a user may create an outline object 58A and begin typing text 56A into that object. If the user desires to generate an aside, the user may enter the previously defined keystroke combination requesting that an aside be created. In response to the receipt of the keystroke combination, a location for a new object 58B is identified. The object 58B is then created and the insertion point 60 is moved to a position within the new object 58B. The user is then free to type or otherwise enter data into the new object 58B. When the user has completed entering text or other data into the new object 58B, the user may again select a key combination which will return the insertion point 60 to its location within the outline object 58A prior to creation of the new object 589B. It should be appreciated that, according to the various embodiments of the invention, the text 56B entered into the aside object 58B may be formatted in a manner to distinguish the text 56B from the text 56A contained in other portions of the electronic document 32. Moreover, according to various embodiments of the invention, the aside object 58B may be located outside the visible portion of the body area 42. Additional details identifying an appropriate location for an aside will be described in greater detail below with respect to FIG. 8.

Once the insertion point 60 has been returned to within the outline object 58A, additional input may be received within that object. If, however, the user desires to create a subsequent aside, the user may again select the predefined key combination. In response to the selection of the key combination, another location for an aside is located within the electronic document 32. The location for the aside is different than the location of the object 58A or the object 58B. In this manner, no objects within the electronic document 32 are located in an overlapping fashion. Once the location for the aside has been identified, a new outline object 58C is created at that location and the insertion point 60 is moved to within the outline object 58C. The user may then type or otherwise enter data into the new outline object 58C. When the user has completed entering data into the object, the keystroke combination may again be entered and the insertion point 60 is returned to its position within the object 58A prior to the creation of the object 58C. Any number of asides may be created within the electronic document 32 in a similar fashion.

According to various embodiments of the invention, an aside may be created while the insertion point 60 is located within an aside. In particular, another key combination may be defined for creating an aside within an aside. If this key combination is selected, a third object may be created and the insertion point moved from the object 58B to the third object. In another embodiment, an aside may not be created from within another aside. In even another embodiment, an aside may be created from within an aside if the existing aside has grown beyond a predefined size. This would allow the size of aside objects to be held to a predetermined maximum size.

Figure 5:
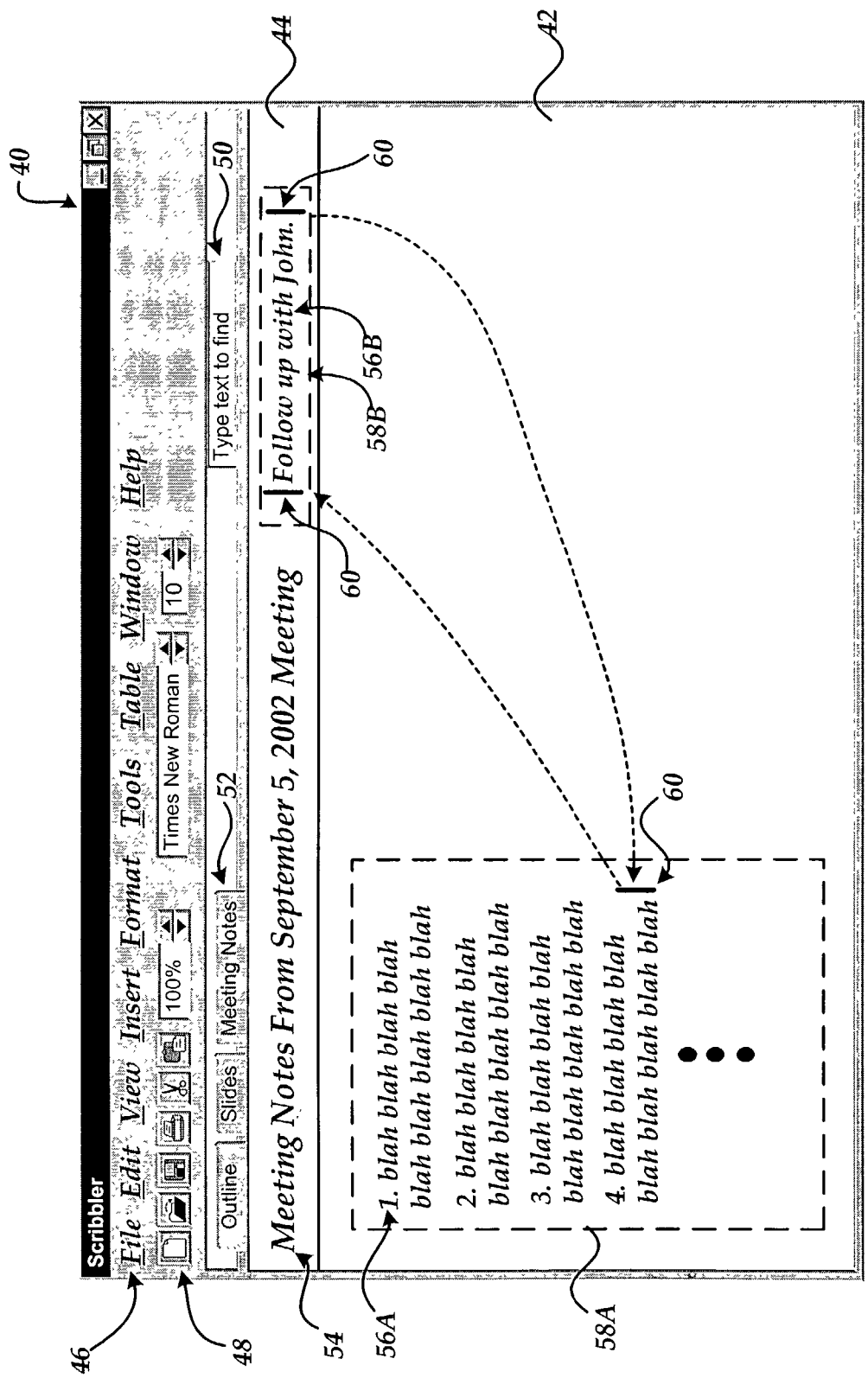

Turning now to FIG. 5, additional details regarding the operation of the note taking application program 28 will be described. In particular, according to one embodiment of the invention, asides may be created within the title area 44 of the electronic document 32. According to one embodiment of the invention, a keystroke combination is defined for creating asides within the title area. Alternatively, a voice command, gesture, or other type of input command may be defined for creating an aside. If this keystroke combination is selected by a user while entering data into the outline object 58, a location for the outline object 58B is located within the title area 44. Once an appropriate location has been identified, the object 58B is created and the insertion point 60 is moved to a location within the object 58B. The user may then type or otherwise enter input into the object 58B. Once the user has completed the entry of information into the object 58B, the user may again type the keystroke combination to return the insertion point 60 to its previous location within the object 58A prior to creation of the object 58B.

According to one embodiment of the invention, a determination is made following receipt of the keystroke combination for creating an aside within the title area 44. In particular, a determination is made as to whether a title 54 has been entered into the title area 44. If no title 54 has been entered, the insertion point 60 is moved to a location within the title area 44 at which a title 54 may be entered. If the keystroke combination is again entered following entry of the title 54, the insertion point 60 will be returned to its previous location within the object 58 prior to entry of the title 54. If a title 54 has been entered into the title area 44, an aside object 58B will be created within the title area 44 in the manner described above.

Figure 6:
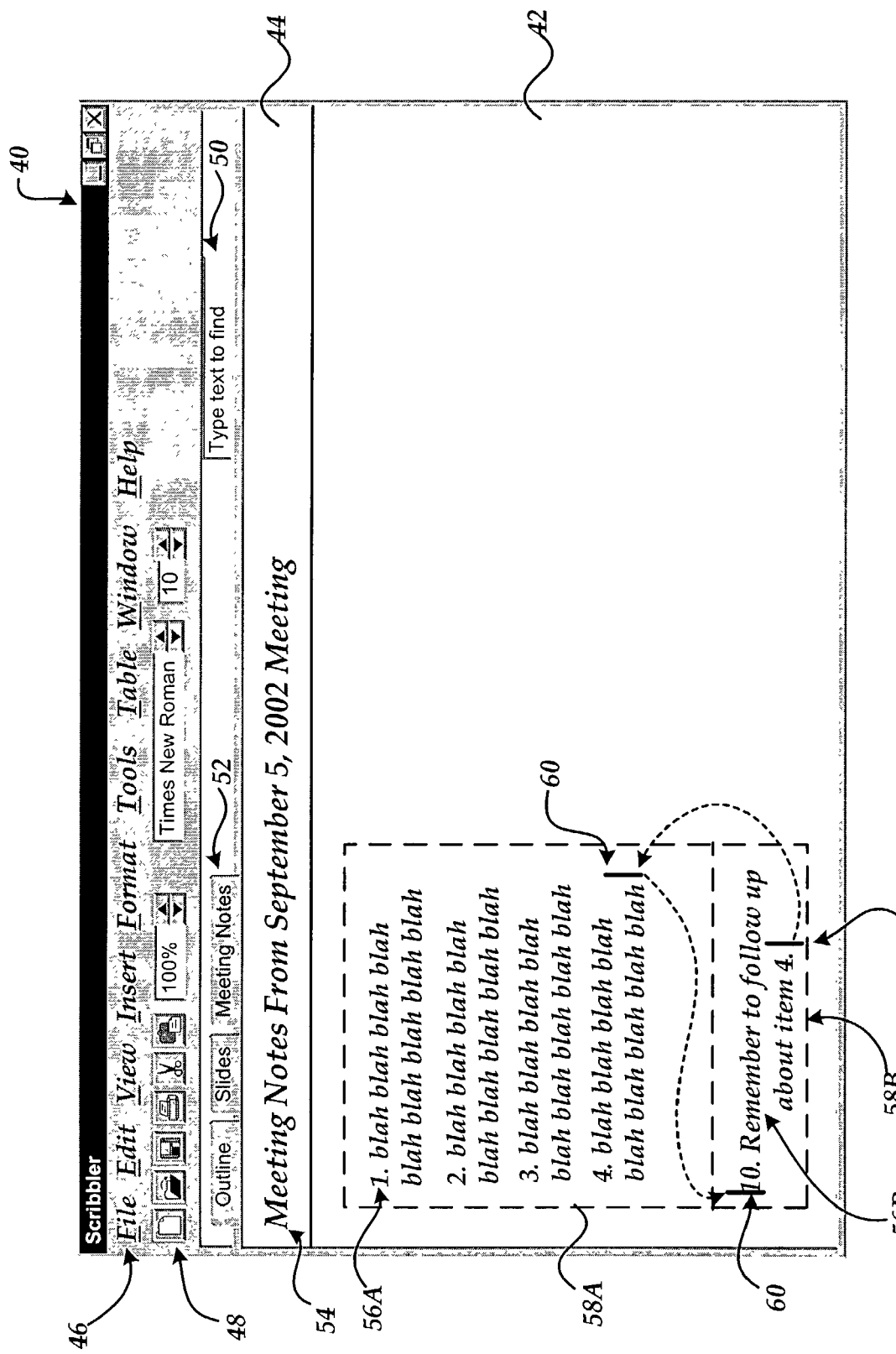

Referring now to FIG. 6, additional details regarding aspects of the note taking application program 28 for creating asides within an electronic document 32 within pre-existing outline objects will be described. In particular, as shown in FIG. 6, an outline object 58A may be created and text 56A entered into the outline object. According to one embodiment of the invention, a keystroke combination may be defined for creating an aside object 58B at the bottom of the outline object 58A. In particular, in response to the selection of such a keystroke combination, a location for the aside object 58B is located at the bottom of the outline object 58A. The aside object 58B is then created at the identified location and the insertion point 60 is moved to a location within the outline object 58B. The user may then type or otherwise enter text 56B into the aside object 58B. Once the user has completed entry of the text 56B, the user may again select a keystroke combination to return the insertion point 60 to its location within the object 58A prior to creation of the aside object 58B. In this manner, asides may be created at the bottom of an outline object 58A. It should be appreciated that asides may be similarly created at the top, to the right of, or to the left of outline objects in a similar fashion.

Figure 7:
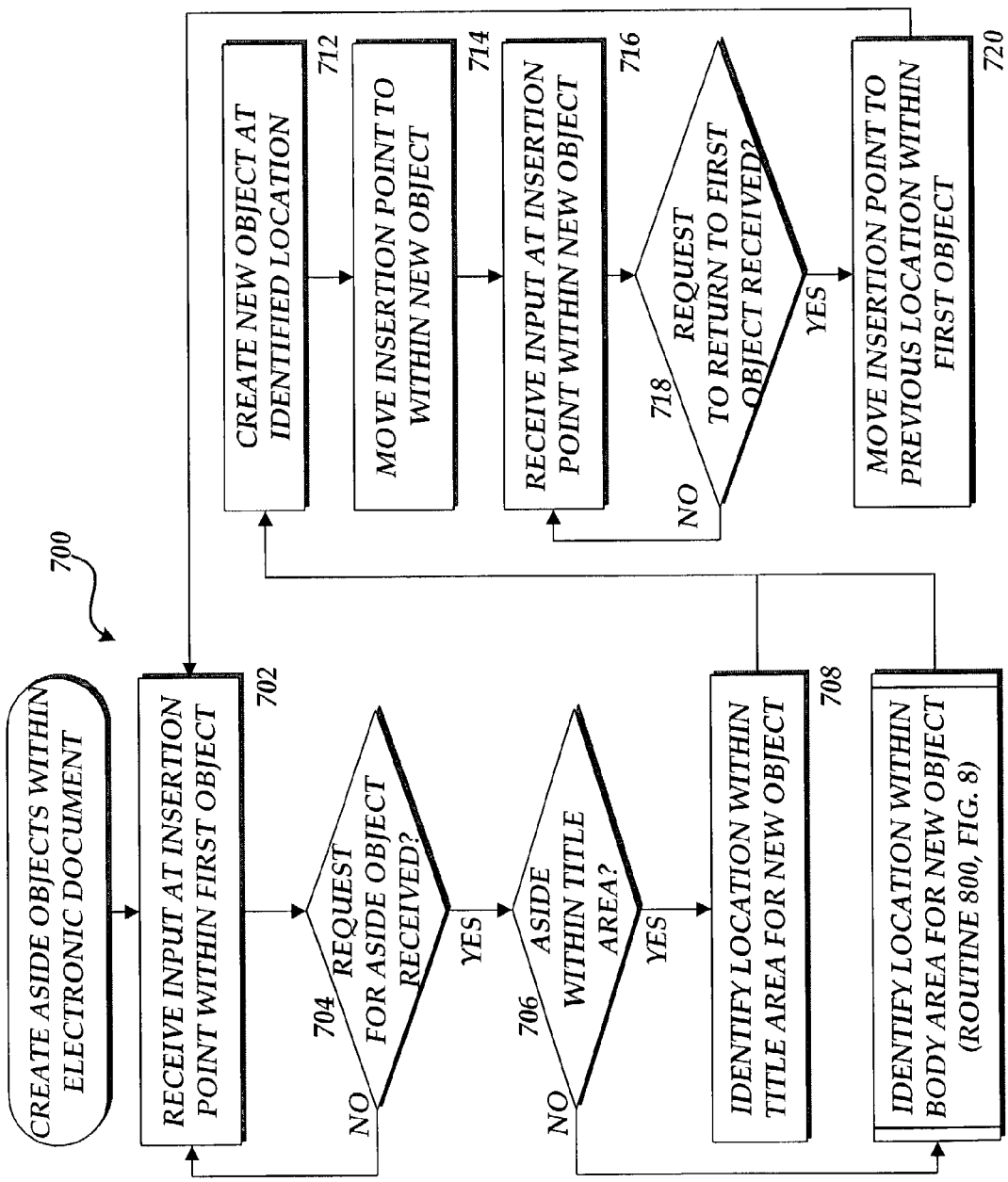
FIG. 7 is a flow diagram illustrating a routine for creating aside objects in an electronic document according to one embodiment of the invention.

Referring now to FIG. 7, an illustrative routine 700 will be described for creating aside objects within an electronic document 32. The routine 700 begins at block 702, where input is received at an insertion point within a first object. As described above, the input may comprise keyboard or pen input. The object may also comprise an outline object, a graphical object, or other type of object.

From block 702, the routine 700 continues to block 704, where a determination is made as to whether a request to generate an aside object has been received. As described above, the request may comprise the selection of a keystroke combination, a keyboard command, or other type of input. If no request to generate an aside object has been received, the routine 700 returns to block 702 where additional input is received. If, however, a request to generate an aside object has been received, the routine 700 continues to block 706.

At block 706, a determination is made as to whether the request to generate the aside object is a request to generate the aside within the title area 44 of the electronic document 32. If the request is one to generate an aside object within the title area 44, the routine 700 continues to block 708, where a location within the title area 44 is identified for the new aside object. The routine 700 then continues from block 708 to block 712.

If, at block 706, it is determined that the request to generate an aside object is not one requesting that the object be created within the title area 44, the routine 700 branches from block 706 to 710. At block 710, a location is identified within the body area 42 for the new aside object. An illustrative routine 800 will be described below with respect to FIG. 8 for identifying a location within the body area 42 of the electronic document 32 for the new aside. From block 710, the routine 700 continues to block 712.

At block 712, the new object is created at the identified location. The routine 700 then continues to block 714, where the insertion point is moved from its location within the first object to a location within the newly created object. From block 714, the routine 700 then continues to block 716, where input may be received at the insertion point and stored within the newly created aside object. As discussed above, the input received within the aside object may comprise keyboard, pen, or other type of input from a user.

From block 716, the routine 700 continues to block 718 where a determination is made as to whether a request has been made to return the insertion point 60 to the first object from its location within the new outline object. If no such request was received, the routine 700 branches from block 718 back to block 716, where input is continually received into the aside object. If such a request was received, such as a keystroke combination, a key command, or other type of input, the routine 700 continues to block 720. At block 720, the insertion point 60 is relocated to its previous location within the first object prior to the creation of the aside object. In this manner, typing or other type of data entry can resume from the exact position where the insertion point was located prior to the creation of the aside object. From block 720, the routine 700 returns to block 702, where additional input is received at the insertion point located within the first object.

Referring now to FIG. 8, an illustrative routine 800 will be described for identifying a location within the body area 42 for a new aside. The routine 800 begins at block 802, where a determination is made as to whether a predefined amount of space is available located to the right of the outline object 58A within the viewable portion of the document 32. From block 802, the routine 800 continues to block 804, where a decision is made as to whether space is available within the viewable portion of the document to the right of the object 58A. If space is available, the routine 800 branches from block 804 to block 806, where the new object 58B is created in a location to the right of the object 58A. The routine 800 then continues from block 806 to block 808, where it returns to block 712.

If, however, it is determined at block 804 that no space exists to the right of the object 58A for the new object 58B, the routine 800 continues to block 810. At block 810, a determination is made as to whether a predetermined amount of space exists below the object 58A and within the viewable portion of the document 32 for the new aside object 58B. The routine 800 then continues to block 812 where a decision is made as to whether the predetermined amount of space is available. If the predetermined amount of space is available below the object 58A, the routine 800 branches to block 814 where the new aside object 58B is created below the object 58A. The routine 800 then continues from block 814 to block 808, where it returns to block 712.

If, at block 812, it is determined that a predetermined amount of space is unavailable below the object 58A, the routine 800 continues to block 816. At block 816, a determination is made as to whether a predetermined amount of space is available to the left of the object 58A and within the viewable portion of the document 32 for the new aside object 58B. From block 816, the routine 800 continues to block 818, where a decision is made as to whether the predetermined amount of space is available to the left of the object 58A. If the predetermined amount of space is available, the routine 800 branches to block 820, where the new aside object 58B is created to the left of the object 58A. The routine 800 then continues from block 820 to block 808 where it returns to block 712.

If, however, at block 818 it is determined that a predetermined amount of space does not exist to the left of the object 58A, the routine 800 continues to block 822. At block 822, a determination is made as to whether a predetermined amount of space is available above the object 58A and within the viewable portion of the document 32. The routine 800 then continues to block 824, where a determination is made as to whether space is available above the object 58A. If a predetermined amount of space is available, the routine 800 continues to block 826 where the new aside object 58B is created above the object 58A. The routine 800 then continues to block 808, where it returns to block 712.

If, at block 824, it is determined that no space exists above the object 58A, and within the viewable portion of the document 32, the routine 800 continues to block 828, where the new aside object 58B is created at a location outside the viewable portion of the document 32. It should be appreciated that the body area 42 of the document 32 may be extended in order to receive the new aside object. Moreover, it should be appreciated that the new aside object may be created on any side of the object 58B outside the viewable portion of the document 32. From block 828, the routine 800 continues to block 808, where it returns to block 712.

It should be appreciated that according to various embodiments of the invention, the aside object 58B may be created immediately adjacent to any side of the outline object 58A, at the bottom of the body area 42, at the top area of the body area 42, or within the title area 44. According to other embodiments of the invention, the new aside object 58B may also be created on a new page of the electronic document 32, in a global location available to other application programs 30, or in another location easily accessible to a user of the note taking application program 28. Moreover, it should be appreciated that the location of a new aside object 58B may be determined differently based on the default user interface language for the personal computer 2. For instance, if the default user interface language for the personal computer 2 is Hebrew, the location of a new aside object 58B may be located to the left of the object 58A rather than being located to the right of the object 58A. This positioning takes into account the right-to-left reading order of a language such as Hebrew.

Based on the foregoing, it should be appreciated that embodiments of the present invention provide methods, apparatus, and computer readable media for creating asides within an electronic document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for creating an aside within an electronic document, the method comprising:

receiving a first input placing an insertion point in an outline object at a first location within a viewable portion of the electronic document;

receiving and displaying a second input at the insertion point;

determining whether the second input includes a key command requesting that the aside be created within the electronic document;

in response to determining that the second input includes the key command, identifying a second location within the viewable portion of the electronic document for a first new object such that the first new object is created in a non-overlapping fashion with respect to the outline object;

creating the first new object at the second location such that the first new object is viewable;

moving the insertion point to within the first new object;

receiving and displaying a third input at the insertion point;

determining that the third input received and displayed at the insertion point is greater than a predetermined size;

in response to determining that the third input received and displayed at the insertion point is greater than the predetermined size, identifying a third location within the viewable portion of the electronic document for a second new object such that the second new object is created in a non-overlapping fashion with respect to the outline object and the first new object;

creating the second new object at the third location such that the second new object is viewable;

moving the insertion point to within the second new object;

receiving and displaying a fourth input at the insertion point;

determining whether the fourth input includes the key command; and in response to determining that the fourth input includes the key command, returning the insertion point to the outline object.

2. The method of claim 1, further comprising applying formatting to the third input displayed within the first new object that distinguishes the third input from data displayed in other portions of the electronic document.

3. The method of claim 2, wherein at least one of the following comprise keystrokes: the first input, the second input, the third input, and the forth input.

4. The method of claim 2, wherein at least one of the following comprise pen input: the first input, the second input, the third input, and the forth input.

5. The method of claim 2,
wherein determining whether the second input includes the key command requesting that the aside be created within the electronic document comprises determining whether the second input includes the key command requesting that the aside be created within a title area of the electronic document; and wherein identifying the second location comprises, in response to determining that the second input includes the key command, identifying the second location within the title area of the electronic document.

6. The method of claim 5, wherein the first new object comprises an aside object.

7. A computer-readable medium comprising computer-readable instructions which, when executed by a computer, cause the computer to perform the method of claim 1.

8. A computer-controlled apparatus capable of performing the method of claim 1.

9. A method for creating an aside within an electronic document, the method comprising:

receiving input placing an insertion point at a location within the viewable portion of the electronic document;

receiving and displaying input at the insertion point;

determining whether the input includes a key command requesting that an aside be created within a body area or a key command indicating that an aside be created in a title area of the electronic document;

in response to determining that the input includes a request to create an aside in the body area of the electronic document, identifying a location within the viewable portion of the body area of the electronic document for a new object such that the new object is created in a non-overlapping fashion, the location for the new object being different than the location of the insertion point, creating the new object at the identified location such that the new object is viewable and moving the insertion point to a location within the new object, receiving and displaying input at the insertion point, and applying formatting to the input displayed within the new object that distinguishes the input from data displayed in other portions of the electronic document, and creating an overflow object for a portion of the input received and displayed at the insertion point when the input received and displayed at the insertion point is greater than a predetermined size;

in response to determining that the input includes a request to create an aside in the title area of the electronic document, identifying a location within the title area of the electronic document for the new object, the location for the new object being different than the location of the insertion point, creating the new object at the identified location and moving the insertion point to a location within the new object, and receiving and displaying input at the insertion point, and applying formatting to the input displayed within the new object that distinguishes the input from data displayed in other portions of the electronic document;

determining whether the input includes the key command; and in response to determining that the input includes the identical key command, returning the insertion point to its location prior to moving the insertion point to the location within the new object.

10. The method of claim 9, wherein the new object comprises an outline object.

11. A computer-readable medium comprising computer-readable instructions which, when executed by a computer, cause the computer to perform the method of claim 9.

12. A computer-controlled apparatus capable of performing the method of claim 9.

* * * * *